United States Patent Office 3,711,430
Patented Jan. 16, 1973

3,711,430
EXPANDABLE COPOLYMERS OF α-OLEFINS AND α,β - MONOETHYLENICALLY UNSATURATED CARBOXYLIC ACIDS
Louis C. Rubens, Midland, Mich., assignor to The Dow Chemical Company, Midland, Mich.
No Drawing. Continuation of abandoned application Ser. No. 731,746, May 24, 1968. This application Feb. 1, 1971, Ser. No. 111,663
Int. Cl. C08f 37/00, 47/10
U.S. Cl. 260—2.5 B   9 Claims

ABSTRACT OF THE DISCLOSURE

New formable thermoplastic materials comprising α-olefins and α,β-monoethylenically unsaturated acids having integrated therewith certain organic blowing agents and/or ammonia. When these thermoplastic materials are in particle form they can be used to mold articles using dielectric heat to cellulate the material.

---

This application is a continuation of my prior application Ser. No. 731,746, filed May 24, 1968, now abandoned.

Low density cellular polyethylene is normally produced by an extrusion process in standard shapes such as planks, rods, tubes, etc. It would be desirable to produce polyethylene foam in molded shapes from expandable granules by methods similar to those employed for production of molded polystyrene foam. Polystyrene will retain entrapped volatile organic blowing agents such as pentane in the unfoamed state for prolonged periods under atmospheric storage conditions. On the other hand, while pure polyethylene can be impregnated with the best known blowing agents (e.g., dichlorotetrafluoroethane) in sufficient quantity for expansion to a low density cellular state, the entrapped blowing agent rapidly diffuses out of the polymer granules during storage and during the foaming process. Even with freshly impregnated polyethylene it has not been possible to achieve expansion ratios greater than 4–5 times the solid volume. Extensive studies on blowing agents systems have failed to reveal a suitable material for production of an expandable bead from pure polyethylene. The same problem has been encountered with other α-olefins such as polypropylene. Polypropylene too has been found to be readily impregnated with dichlorotetrafluoroethane and other blowing agents; however, retention of such blowing agents under normal atmospheric storage conditions is poor as in the case of the polyethylene. Slight improvement of blowing agent retention has been achieved by coating the impregnated particles with toluene diisocyanate and glycerine. However, such improvement has not been considerable enough for commercial success. The usual methods for foaming expandable polystyrene granules (e.g., steam contact) does not work well for polyethylene or polypropylene. Moreover, foam stability is poor.

I have found that α-olefins copolymerized with α,β-monoethylenically unsaturated acids exhibit enhanced retention of organic blowing agents and foam to lower densities when heat plastified. When such copolymers are sequentially pressurized with an organic blowing agent and $NH_3$ they expand from 20–24 volumes to stable foams. Foamability is retained for at least 27 hours at room temperature. Moreover, I have found that pure $NH_3$ can be employed as the expanding agent for such copolymers. Greater than 20 volume expansion can be attained with these compositions after at least 4 hours atmospheric storage of impregnated particles or granules. The "shelf life" with pure $NH_3$ is less than for the dichlorotetrafluoroethane-$NH_3$ mixture.

This invention describes new cellular thermoplasts and teaches the use of dielectric heat to foam and fuse α-olefin-α,β-monoethylenically unsaturated acid copolymers rapidly and efficiently without the use of aqueous electrolytic mixtures.

Dielectric heating is well suited for use in foaming processes because it offers a potential method of generating heat rapidly and uniformly within a homogenous material, provided that, as here, the composition contains materials having a high electrical loss factor and consequently heat rapidly in a high frequency field.

It is an object of this invention to provide new and useful cellular thermoplastic compositions.

It is another object of this invention to provide expandable polyolefinic-α,β-monoethylenically unsaturated acid copolymers.

It is yet another object of this invention to provide such copolymeric compositions capable of being foamed utilizing an organic blowing agent and/or $NH_3$.

It is yet another object of this invention to provide poly-α-olefinic materals capable of being foamed in the form of particles wherein the particles have a greatly increased capability to retain volatile organic blowing agents under storage and foaming conditions.

It is another object of this invention to provide poly-α-olefinic copolymeric compositions capable of being foamed in the form of particles having a greatly increased retentivity of an ammoniacal blowing agent.

It is another object of this invention is provide poly-α-olefinic compositions in the form of particles capable of being cellulated after storage by the use of dielectric heat.

Other and related objects may appear from the following description of the invention.

According to the invention the foregoing and related objects are obtained by impregnating various polyolefinic compositions with organic blowing agents and/or ammonia under controlled conditions, storing said compositions under controlled conditions and foaming such compositions at varying times and temperatures.

Efficient utilization of an entrapped blowing agent requires that the expansion rate of a heat-plastified particle or granule be much larger than the loss of blowing agent by permeation through the polymer. This has been difficult to achieve in the case of polyolefins due to (a) the high permeation rate of volatile organic compounds through the polymer and (b) the low thermoconductivity and relatively high heat requirements for melting of crystallites. Blowing agent "efficiency" is defined as the ratio of observed to theoretical expansion assuming ideal gas behavior of entrapped blowing agent ($PV=nRT$).

The method of heating an expandable granule can be important if the loss of blowing agent is rapid. Conduction of heat to the granule from a fluid or gas results in a temperature gradient from the surface to the interior of the granule until thermal equilibrium is established. Permeability increases with temperature and loss of crystallinity. Consequently, considerable blowing agent can be lost from the granule before the center is hot enough to foam. With high frequency electrical heating, the interior heats more rapidly but the surface layer may not be sufficiently plastified to flow under the influence of internal blowing stress. I have found that expandable α-olefinic copolymer particles foam faster and to a larger volume in a high frequency electrical field (27 mHz.) than in an air oven, oil bath, or steam atmosphere.

To illustrate the problem, pure polyethylene containing 14.2 by weight percent of dichlorotetrafluoroethane is heated in oil at 120° C. It foams only to 4–5 volumes. Use of dielectric heat in the case of pure polyethylene or pure polypropylene is also found to be unsatisfactory in that the loss factor of these polymers are too low to permit efficient dielectric heating. By contrast, when various copolymers of ethylene with acrylic acid and propylene with acrylic acid are impregnated with volatile organic blowing agents and/or ammonia, great improvement is obtained in storage stability and foamability over the pure polymers.

The olefin-acid copolymers contemplated for use in the present invention include both the random copolymers and the graft copolymers. These copolymers can be obtained commercially or they can be prepared by a variety of suitable techniques well known in the polymerization art. While the invention is not to be limited or bound by any particular technique for preparing the copolymers, suitable methods for preparing graft copolymers which can be used in the practice of this invention are outlined in U.S. Pats. 3,177,269 and 3,270,090, the disclosures of which are specifically incorporated herein by reference.

In either the random or the graft copolymers suitable for use in the practice of this invention, it is generally preferred that the copolymer contain between about 70 and about 95 percent by weight combined olefin and between about 5 and about 30 percent by weight combined acid.

As a general proposition, monoolefins having between 2 and 6 carbon atoms per molecule, inclusive, can be employed in preparing the copolymers which are subsequently used in the practice of this invention. Exemplary monolefins within this class include ethylene, propylene, 1-butene, 1-pentene, 2-pentene, 1-hexene, 3-hexene, 3-methylbutene-1, 4-methyl-pentene-1, 4-methylhexene-1, and the like. Copolymers employing ethylene or propylene as the olefin are generally preferred from the standpoint of economics and because of the ease with which they will react with an acid or with which a homopolymer of them will serve as a base or trunk to which the acid can be grafted.

Any $\alpha,\beta$-monoethylenically unsaturated carboxylic acid having between 3 and 8 carbon atoms per molecule, inclusive, which is copolymerizable with an olefin of the class described or which is suitable for grafting onto a homopolymer of an olefin of the class described, can be used to prepare a copolymer for use in the present invention. Exemplary acids including monocarboxylic acids and polycarboxylic acids within this class include acrylic, methacrylic, ethacrylic, crotonic, isocrotonic, tiglic, angelic, senecioic, fumaric, maleic, itasonic, citrasonic, and the like. Among these, acrylic acid ($CH_2=CH-COOH$) is preferred. The term used to describe the acid portion of the copolymer of this invention is intended to include suitable $\alpha,\beta$-monoethylenically unsaturated anhydrides of carboxylic acids such as maleic anhydride. Although maleic anhydride is not a carboxylic acid because it does not have a hydrogen attached to the carboxylic groups, it is considered to be an acid for the purpose of this invention because its chemical reactivity is that of an acid. The acid portion of the copolymer is also intended to include metallic or other salts of the carboxylic acid groups and monoesters of the polycarboxylic acids such as methyl hydrogen maleate, methyl hydrogen fumarate, ethyl hydrogen fumarate, and the like.

The copolymer need not necessarily comprise a two-component polymer. Thus, although the olefin content of the copolymer should be at least 70 percent by weight, more than one olefin can be employed to provide the hydrocarbon nature of the copolymer. Additionally any third copolymerizable monomer can be employed in combination with the olefin and the carboxylic acid comonomer. The ionic hydrocarbon copolymers described in U.S. Pat. 3,264,272 may also be used in the present invention to good effect.

The following series of examples indicate the workings of my invention. They are not intended to be restrictive or limiting in any way but merely illustrative of the scope and range of the present invention.

EXAMPLE 1

Ten gram samples of granular pure polyethylene and two copolymers of ethylene with acrylic acid (8.0 percent and 29.9 percent acrylic acid respectively) are sealed in glass ampoules with sufficient dichlorotetrafluoroethane to cover the particles. After 48 hours at 75° C. the ampoules are cooled to −73° C. and opened. The amounts of dichlorotetrafluoroethane in the granules initially and after open atmospheric storage are determined by weighing.

TABLE I

| Polymer | Grams $C_2F_4Cl_2$ per 100 grams of polymer after indicated open storage time at 72° F. | | | | |
|---|---|---|---|---|---|
| | Initial | 2 hrs. | 20 hrs. | 44 hrs. | 116 hrs. |
| Pure polyethylene | 13.2 | 10 | 6 | 3.8 | 2.1 |
| 92% ethylene—8% acrylic acid | 12.8 | 11.5 | 8.8 | 7.3 | 4.8 |
| 70.1% ethylene—29.9% acrylic acid | 15.8 | 15.6 | 15.0 | 13.9 | 13.7 |

From these data, the relative times required for loss of 20 percent of the initial entrapped $C_2F_4Cl$ are:

Pure polyethylene _____ 1
92% ethylene, 8% acrylic acid _____ 3.2
70.1% ethylene, 29.9% acrylic acid _____ 56

The pure polyethylene sample expanded 4–5 volumes in 120° C. silicone oil for about 24 hours after preparation and atmospheric storage. After 48 hours only 2–3 volume expansion occurred. By contrast, the impregnated 70.1 percent ethylene, 29.9 percent acrylic acid copolymer, foamed to 7–9 volumes after 168 hours storage. The copolymer granules expanded very well in a high frequency dielectric oven (27 mHz.) while the pure polyethylene would not foam.

EXAMPLE 2

A sample of 70.1 percent ethylene-29.9 percent acrylic acid copolymer is sequentially pressurized with $C_2F_4Cl_2$ and $NH_3$ in sealed glass ampoules at 75° C. Data are summarized below:

Initial polymer weight (gms.) = 13.396
$C_2F_4Cl_2$ impregnated polymer (24 hrs.) at 75° C. = 16.060 (~15.24 gms./100 gms. polymer)
$NH_3 + C_2F_4Cl_2$ + polymer (3 hrs. in $NH_3$ at 75° C.) = 17.303 (~8.91 gms. $NH_3$/100 gms. polymer)

Table II summarizes data for the foaming behavior of this polymer in a 27 mHz. dielectric oven.

TABLE II

[Foaming behavior of 70.1% ethylene—29.9% acrylic acid copolymer granules sequentially impregnated with $C_2F_4Cl_2$ and $NH_3$ (after 27 hrs. open storage)]

| Electrode spacing (in.) | Voltage gradient (v./cm.) | Time to maximum volume (sec.) | Vf/Vs after aging foam at 72° F. for indicated times | | |
|---|---|---|---|---|---|
| | | | 0.2 hr. | 3 hrs. | 30 hrs. |
| 1 | 1,000 | 1–2 | (¹) | | |
| 2 | 460 | 6–7 | 6 | 6 | 6 |
| 3 | 300 | 17–18 | 24 | 21 | 20 |
| 4 | 230 | 39 | 20 | 19 | 18 |

¹ Collapsed.

These data show that the combination of the dichlorotetrafluoroethane and $NH_3$ results in expandable particles which can be stored under atmospheric conditions for at least 24 hours without serious loss of foamability. The $NH_3$ treatment has several desirable effects upon the foaming behavior of the dichlorotetrafluoroethane impregnated ethylene-acrylic acid copolymers: (1) faster heating in the radio frequency field; (2) cell nucleation (cell size reduced by a factor of 10–100); (3) expansion to lower density foams.

EXAMPLE 3

The copolymer of 78.0 percent ethylene, 11.0 percent acrylic acid, and 11.0 percent isobutyl acrylate is sequentially pressurized with ammonia and dichlorotetrafluoroethane. This copolymer absorbs 23 grams of the dichlorotetrafluoroethane per 100 grams and 8 grams of $NH_3$ per 100 grams. Some of the freshly impregnated granules are placed in the dielectric oven with an electrode spacing of 4 inches. In about 10 seconds they expand to 70–80 volumes. However, after about 1 hour at room temperature, the foam has shriveled down to about 8–10 volumes. The rest of the impregnated granules are placed in storage at room temperature. After overnight storage some of the granules are foamed in the dielectric oven and foamed to about 20–25 volumes. Upon cooling to room temperature the foam does not collapse. The rest of the granules are stored for 2 days in open storage. After the 2 day storage they are foamed in the dielectric oven and foamed to about 10 volumes. These foam samples are all of high quality with uniform, fine cells.

EXAMPLE 4

Twelve gram samples each of pure polyethylene and the ethylene-acrylic acid copolymers in granular form are covered with liquid $NH_3$ in 40 cc. sealed glass ampoules. The ampoules are kept at 72° F. for 64 hours before opening. The granules are weighed immediately after removal from the ampoules, stored in aluminum weighing dishes and reweighed after various intervals of time. Concurrently with the $NH_3$ loss study, granules are heated in the dielectric oven to study foaming behavior. The data in the following table show that foams resistant to atmospheric collapse can be made from ethylene-acrylic acid copolymers with $NH_3$ as a blowing agent. $NH_3$ does not permeate into the pure polyethylene in sufficient quantity to cause expansion to a low density cellular state.

TABLE III

[Dielectric foaming of $NH_3$ impregnated ethylene-acrylic acid copolymers after various periods of open storage at 72° F.]

Electrode spacing: 1 inch      Calc. volts/cm.=1,000

| | | | | | | | |
|---|---|---|---|---|---|---|---|
| (1) 92% ethylene-8% acrylic acid copolymer: | | | | | | | |
| Storage time, hrs | 0.1 | 1.0 | 2.0 | 4.0 | 22.5 | 30.5 | 55.0 |
| Total $NH_3$ (gms./100 gms. P) | 5.83 | 4.25 | 3.73 | 3.33 | 2.22 | 1.64 | 1.64 |
| "Free"[1] $NH_3$ (gms./100 gms. P) | 3.94 | 2.36 | 1.84 | 1.44 | 0.33 | 0 | 0 |
| Foaming time, sec | 4.4 | 3.7 | 7.4 | 8.3 | 17.2 | 15.2 | 22.3 |
| Foam vol., initial[2] | 22 | 21 | 18 | 20 | <1.5 | <1.5 | <1.5 |
| Foam vol., 48 hrs. at 72° F | 15 | 14 | 12 | 12 | | | |
| (2) 70.1% ethylene-29.9% acrylic acid copolymer: | | | | | | | |
| Storage time, hrs | 0.1 | 1.0 | 2.0 | 4.0 | 22.5 | 30.5 | 55.0 |
| Total $NH_3$ (gms./100 gms. P) | 17.27 | 14.63 | 13.57 | 12.67 | 10.08 | 9.63 | 9.15 |
| "Free" $NH_3$ (gms./100 gms. P) | 10.21 | 7.57 | 6.51 | 5.61 | 3.02 | 2.57 | 2.09 |
| Foaming time, sec | 0.9 | 1.2 | 1.4 | 1.4 | 1.7 | 1.8 | 1.9 |
| Foam vol., initial[2] | 29 | 22 | 19 | 24 | 2.3 | 1.6 | 1.4 |
| Foam vol., 48 hrs. at 72° F | 27.5 | 22 | 21 | 23 | 2.3 | 1.6 | 1.4 |

[1] "Free" $NH_3$=Total $NH_3$-Theoretical $NH_3$ for salt formation.
[2] Foam volume=Ratio of expanded particle vol./initial solid vol.

EXAMPLE 5

Five grams of 70.1 percent ethylene-29.9 percent acrylic acid copolymer is sequentially pressurized with $NH_3$ and $C_2F_4Cl_2$ in sealed glass ampoules at 75° C. After 27 hours open storage, the expandable granules are placed in a 50 cc. polypropylene vial and put between the electrodes of a 27 mHz. dielectric oven. After 60 seconds, using a 4-inch electrode spacing, the vial is removed and examined. Expanded particles are found to be fused together and the foam is tough and resilient.

EXAMPLE 6

10 grams of Celogen OT, a thermosensitive nitrogen releasing blowing agent, (pp'-oxy bisbenzenesulfonyl hydrazide) was mixed with 90 grams of a copolymer of 92% ethylene and 8% acrylic acid at 125° C. A molding was prepared from this mixture with dimensions 2" x 2" x 0.1". This sample was placed in a sealed vessel with $NH_3$ for 3 hours at 75° C. After removal from the $NH_3$, it was found that the sample had increased in weight by 5.8%. After 2 hours at 72° F., the $NH_3$ concentration dropped to 3.5%.

The aged sample (2 hours) expanded 31 volumes in a 27 mHz. dielectric oven compared to 19 volumes with the $NH_3$ alone as a blowing agent indicating that the Celogen OT had decomposed to yield $N_2$ which contributed to the foam expansion.

The final foam sample dimensions were 5.51" x 5.51" x .27".

EXAMPLE 7

A solid copolymer of 88% propylene with 12% acrylic acid (Melt Index 1.2) in the form of 0.12" diameter granules in a sealed ampoule containing dichlorotetrafluoroethane increased 11.8% in weight in 4 hours at 100° C. (Sample 7–1.)

The dichlorotetrafluoroethane containing granules were placed in a sealed glass ampoule with liquid ammonia for 3 hours at 75° C. The sample increased in weight by 4.8%. (Sample 7–2.)

Sample 7–1 would not heat sufficiently in a 27 mHz. dielectric oven to become heat plastified and foam.

Sample 7–2 foamed to a cellular product 6.2 times the initial volume of the solid polymer in 3 minutes with an electrode spacing of 1 inch.

In the examples shown above, a Thermex 7 RB dielectric oven with a 7.5 kv. output at 27.32 mHz. was used. The manufacturer estimates the peak RF voltage on the 15-inch x 15-inch electrode at 20 kv. when the plate separation is 2.25 inches. This machine can deliver a maximum of 107.5 kilocalories per minute to a material which could absorb all of its energy. The fraction of this potential energy which can be converted to useful heat depends upon the loss factor of the dielectric and the amount of it in the field between the electrodes.

The blowing agents used may be volatile organic compounds alone, or with the $NH_3$, or thermosensitive nitrogen releasing agents used in conjunction with the $NH_3$.

Examples of suitable volatile organic compounds that can be incorporated in accordance with the present invention to form compositions by the method of the invention are preferably saturated aliphatic or cyclic perchlorofluoro carbons. Examples of suitable perchlorofluoro carbons are:

| | |
|---|---|
| $CCl_3F$ | $CF_3$—$CClF_2$ |
| $CCl_2F_2$ | $CF_2$—$CClF$ |
| $CClF_3$ | $CF_2$—$CF_2$ |
| $CCl_2F$—$CCl_2F$ | $CF_2$—$CClF$ |
| $CClF_2$—$CCl_2F$ | $CF_2$—$CClF$ |
| $CClF_2$—$CClF_2$ | |

Mixtures of any two or more of such volatile organic compounds can also be used.

Examples of thermosensitive nitrogenic releasing agents are: benzene sulfonyl hydrazide, pp'-oxy bisbenzene sulfonyl hydrazide, and N,N'-dinitroso N,N'-dimethyl terphthalamide, and the like.

The type of blowing agents is not limited to those employed in the examples nor to those listed above.

In the selection of a blowing agent it is generally felt to be necessary that the blowing agent have a low permeability value through the polymer. Permeability (P) is a function of a diffusion coefficient (D) and the solubility (S). Thus, $P=DS$.

The usual method for obtaining a low permeation rate is to select a blowing agent with a large molecular diameter which also has a solubility parameter (S) significantly different than that of the polymer. This is the case with the perchlorofluorocarbon blowing agents listed above. The solubility (S) must not be too low, however, or the maximum concentration of blowing agent in an impregnated granule will be too small for expansion to a low density cellular product. With the thermosensitive nitrogen releasing agents employed in accordance with the present invention, the solubility of $N_2$ is quite low and the molecule ($N_2$) is relatively small; however, in combination with $NH_3$, excellent results are obtained as seen in Example 6, above. This is probably because the thermosensitive agent itself is not soluble in the polymer or copolymer and is mixed therein in discrete particles so that upon release of the $N_2$ gas, excellent cellulation results. By modifying the olefin through copolymerization with polar monomers such as acrylic acid it is felt that the solubility parameter was increased.

It is not intended to limit the invention to the particular set or sets of operation or conditions described above since these factors may be varied over a considerable range depending upon the particular copolymer being treated, the time period for which the electrical energy is applied, the frequency used, etc., but it is believed that these variables (electrical input, frequency, etc.) can be readily determined for any specific utility by simple and obvious adjustment as indicated by the foregoing description.

The frequency of the current required to produce an electrical energized field necessary to heat treat the plastic mass may properly vary within fairly wide limits. Generally, suitable results are obtained when the frequency is between from about 6 mHz. and about 200 mHz. It is difficult to state that what the optimum frequency conditions are for each composition because of the varying electrical and chemical characteristics of each. However, the optimum frequency can be determined by testing a few values in the above range and to those familiar with high frequency electrical equipment, this is no particular problem.

A particular commercial advantage of the use of high frequency current in accordance with this invention is the greatly increased speed of operation as compared to the application of external heat in the conventional manner, so that a considerable saving in time, labor and equipment is effected.

In accordance with my invention, expandable compositions are prepared from $\alpha$-olefin-$\alpha,\beta$-monoethylenically unsaturated acids copolymers which heat plastify and foam readily in a dry state in a high frequency electrical field. This is of particular advantage in the dielectric foaming of expandable sheet and sandwich structures. Numerous advantageous uses of such compositions and methods for making same are easily seen in the field of preparation of packaging materials, for example.

It should be understood that the invention is not to be based upon nor depended upon the theories or calculations which I have expressed. Nor is the invention to be regarded as limited to the express procedure or materials set forth, these details being given only by way of illustration. Such specific details are essential to the invention only insofar as they are expressed by way of limitation in the following claims in which it is my intention to claim all novelty inherent in the invention as broadly as is permissible in view of the prior art.

What is claimed is:

1. A mass of expandable olefin polymer granules having a shelf life of at least 4 hours under open atmospheric storage conditions at room temperature and capable of being foamed by dielectric heating, the composition comprising particles of a copolymer of from about 70 to 95 weight percent of an $\alpha$-olefin having between 2 and 6 carbon atoms, inclusive, and from 5 to 30 weight percent of an $\alpha,\beta$-monoethylenically unsaturated carboxylic acid having between 3 and 8 carbon atoms per molecule, inclusive, and having integrated therewith from about 2 percent to about 25 percent by weight of a saturated perchlorofluorocarbon, based on the weight of the copolymer.

2. A composition having a shelf life of at least 4 hours and capable of being foamed by dielectric heating, the composition comprising particles of a copolymer of from about 70 to 95 weight percent of an $\alpha$-olefin having between 2 and 6 carbon atoms, inclusive, and from 5 to 30 weight percent of an $\alpha,\beta$-monoethylenically unsaturated carboxylic acid having between 3 and 8 carbon atoms per molecule, inclusive, and having integrated therewith from about 2 percent to about 25 percent by weight of a saturated perchlorofluorocarbon, based on the weight of the copolymer, and ammonia also integrated therewith in amounts in excess of that needed to combine with the carboxylic groups.

3. The granules as claimed in claim 1 wherein said saturated perchlorofluorocarbon is 1,2-dichlorotetrafluoroethane.

4. A composition as claimed in claim 2 wherein said copolymer comprises between about 70 and about 95 percent by weight combined ethylene and between 5 and about 30 percent by weight acrylic acid.

5. A mass of expandable olefin polymer granules having a shelf life of at least 4 hours under open atmospheric storage conditions at room temperature and capable of being foamed by dielectric heating, the mass comprising particles of a copolymer of from about 70 to 95 weight percent of an $\alpha$-olefin having between 2 and 6 carbon atoms, inclusive, and from 5 to 30 weight percent of an $\alpha,\beta$-monoethylenically unsaturated carboxylic acid having between 3 and 8 carbon atoms per molecule, inclusive, and having integrated therewith ammonia in amounts in excess of that needed to combine with the carboxylic groups.

6. A method of making cellular thermoplastic compositions comprising the steps of permeating particles of a copolymer of from about 70 to 95 weight percent of an $\alpha$-olefin having between 2 and 6 carbon atoms, inclusive, and from 5 to 30 weight percent of an $\alpha,\beta$-monoethylenically unsaturated carboxylic acid having between 3 and 8 carbon atoms per molecule, inclusive, by pressurizing with from about 2 percent to about 25 percent by weight of a saturated perchlorofluorocarbon, based on the weight of the copolymer, and ammonia in amounts in excess of that needed to combine with the carboxylic groups of said carboxylic acid and thereafter heating said particles by subjecting them to a high frequency electrical field of from about 6 megacycles per second to about 200 megacycles per second.

7. The method of claim 6 wherein said $\alpha$-olefin is ethylene or propylene, said carboxylic acid is acrylic acid and said saturated perchlorofluorocarbon is 1,2-dichlorotetrafluoroethane.

8. A method of making cellular thermoplastic compositions comprising the steps of mixing particles of a copolymer of from about 70 to 95 weight percent of an $\alpha$-olefin having between 2 and 6 carbon atoms, inclusive, and from 5 to 30 weight percent of an $\alpha,\beta$-monoethylenically unsaturated carboxylic acid having between 3 and 8 carbon atoms per molecule, inclusive, with from about 2 percent to about fifteen percent by weight of a thermosensitive nitrogenic releasing agent and ammonia in amounts in excess of that needed to combine with the carboxylic groups of said carboxylic acid, and thereafter heating said particles by subjecting them to a high frequency electrical field of from about 6 megacycles per second to about 200 megacycles per second.

9. The method of claim 8 wherein said α-olefin is ethylene, said carboxylic acid is acrylic acid and said thermosensitive nitrogenic releasing agent is pp'-oxybis benzenesulfonyl hydrazide.

References Cited

UNITED STATES PATENTS

| | | | |
|---|---|---|---|
| 3,504,068 | 3/1970 | Zizlsperger et al. | 260—2.5 B |
| 3,194,854 | 7/1965 | Smith | 260—2.5 E |
| 3,389,109 | 6/1968 | Harmon et al. | 260—29.6 H |
| 3,264,272 | 8/1966 | Rees | 260—88.1 R |

MURRAY TILLMAN, Primary Examiner

W. J. BRIGGS, Sr., Assistant Examiner

U.S. Cl. X.R.

260—2.5 HA, 33.8 UA, 88.1 R, 897 B; 264—26